(12) United States Patent
Riley et al.

(10) Patent No.: US 10,865,126 B2
(45) Date of Patent: Dec. 15, 2020

(54) STORMWATER FILTER SOCKS WITH MULTIPLE SEPARATED TUBES

(71) Applicant: New Pig Corporation, Tipton, PA (US)

(72) Inventors: Matthew James Riley, Hollidaysburg, PA (US); Michael James Verti, Manor, PA (US); Dane R. Jackson, Port Matilda, PA (US)

(73) Assignee: New Pig Corporation, Tipton, PA (US)

( * ) Notice: Subject to any disclaimer, the term of this patent is extended or adjusted under 35 U.S.C. 154(b) by 113 days.

(21) Appl. No.: 16/279,269

(22) Filed: Feb. 19, 2019

(65) Prior Publication Data

US 2019/0256373 A1 Aug. 22, 2019

Related U.S. Application Data

(60) Provisional application No. 62/632,103, filed on Feb. 19, 2018.

(51) Int. Cl.
| | |
|---|---|
| *C02F 1/28* | (2006.01) |
| *B01D 15/18* | (2006.01) |
| *E03F 5/04* | (2006.01) |
| *B01J 20/28* | (2006.01) |
| *C02F 101/20* | (2006.01) |
| *C02F 101/32* | (2006.01) |
| *C02F 103/00* | (2006.01) |

(52) U.S. Cl.
CPC .............. *C02F 1/281* (2013.01); *B01D 15/18* (2013.01); *B01J 20/2805* (2013.01); *C02F 1/283* (2013.01); *C02F 1/285* (2013.01); *C02F 1/286* (2013.01); *E03F 5/0404* (2013.01); *C02F 2101/20* (2013.01); *C02F 2101/32* (2013.01); *C02F 2103/001* (2013.01); *C02F 2201/002* (2013.01)

(58) Field of Classification Search
None
See application file for complete search history.

(56) References Cited

U.S. PATENT DOCUMENTS

| | | |
|---|---|---|
| 4,497,712 A | 2/1985 | Cowling |
| 4,840,734 A | 6/1989 | Johnson |
| 6,083,402 A | 7/2000 | Butler |
| 7,070,691 B2 | 7/2006 | Lindemulder |

(Continued)

OTHER PUBLICATIONS

The International Search Report and the Written Opinion of the International Searching Authority for International Application No. PCT/US2019/018588, 6 pages.

*Primary Examiner* — Matthew O Savage
(74) *Attorney, Agent, or Firm* — Alan G. Towner; Leech Tishman Fuscaldo & Lampl

(57) ABSTRACT

Multiple-tube stormwater filter socks may be used to mitigate stormwater environmental runoff of sediment, hydrocarbons and heavy metals. The stormwater filter socks comprise at least two tubes that are spaced apart by a separator web, and are filled with different types of absorbent media. The stormwater filter socks may be placed around the top grate of a storm drain chamber, and around other environmental runoff sources such as trash bins, roof downspouts and outdoor material stockpiles. The multiple-tube stormwater filter socks may be used to mitigate drips and spills of hydrocarbons such as motor oils, and may be used to contain zinc, copper, lead, chromium, cadmium and other heavy metals.

23 Claims, 4 Drawing Sheets

(56) References Cited

U.S. PATENT DOCUMENTS

| | | | |
|---|---|---|---|
| 7,074,326 | B2 | 7/2006 | Singleton |
| 7,300,574 | B1 | 11/2007 | Lewis |
| 7,455,766 | B1 | 11/2008 | Lewis |
| 8,088,279 | B2 | 1/2012 | McInnis et al. |
| 9,045,875 | B2 | 6/2015 | Ozersky et al. |
| 9,297,134 | B1 | 3/2016 | Dancer |
| 2002/0081153 | A1 | 6/2002 | Genzel |
| 2004/0112811 | A1* | 6/2004 | Lindemulder ............ E03F 1/00 210/163 |
| 2008/0279633 | A1 | 11/2008 | DeAngelis |
| 2016/0030867 | A1 | 2/2016 | Love et al. |
| 2016/0340889 | A1 | 11/2016 | Tomberlin et al. |

* cited by examiner

STORMWATER FILTER SOCKS WITH MULTIPLE SEPARATED TUBES

CROSS-REFERENCE TO RELATED APPLICATION

This application claims priority from U.S. Provisional Application No. 62/632,103 filed Feb. 19, 2018, which is incorporated herein by reference.

FIELD OF THE INVENTION

The present invention relates to stormwater filter socks, and more particularly relates to stormwater filter socks with multiple separated tubes.

BACKGROUND INFORMATION

Current stormwater filter socks may include a large tube that can be sewn or bonded to form two or more adjacent touching tubes that may be filled with absorbent media. However, such filter socks with tubes that contact each other have poor lateral flexibility.

SUMMARY OF THE INVENTION

The present invention provides multiple-tube stormwater filter socks that may be used to mitigate stormwater environmental runoff of sediment, hydrocarbons, nutrients and heavy metals. The stormwater filter socks comprise at least two tubes that are spaced apart by a separator web, and are filled with different types of absorbent media. The stormwater filter socks may be placed around top grates of storm drain chambers, and around other environmental runoff sources such as trash bins, roof downspouts, outdoor material stockpiles and the like. The multiple-tube stormwater filter socks may be used to mitigate drips and spills of hydrocarbons such as motor oils, may be used to contain nutrients, and may be used to contain zinc, copper, lead, chromium, cadmium and other heavy metals.

An aspect of the present invention is to provide a multiple-tube stormwater filter sock comprising a downstream tube including a liquid permeable outer shell and an absorbent media at least partially filling the outer shell, an upstream tube comprising a liquid permeable outer shell and an absorbent media at least partially filling the outer shell, and a separator web between the downstream and upstream tubes having a width measured between the downstream and upstream tubes, wherein the separator web is structured and arranged to allow side-by-side bending of the downstream and upstream tubes during installation of the stormwater filter sock.

This and other aspects of the present invention will be more apparent from the following description.

DETAILED DESCRIPTION

The present invention provides multiple-tube stormwater filter socks comprising two or more side-by-side joined tubes spaced apart from each other by a separator web, and are filled with absorbent media. As opposed to conventional sock designs in which adjoining tubes are in direct contact with each other resulting in little or no side-to-side lateral flexibility, the tubes of the present invention are attached to each other, but spaced apart, to significantly improve side-to-side flexibility. Thus, the multiple-tube stormwater filter socks of the present invention can be easily laterally bent for non-linear positioning during use.

The multiple-tube stormwater filter socks of the present invention can be used to remove pollutants from contaminated stormwater runoff Polluted water flows through the socks where the pollution is either stopped or absorbed. Pollutants include but are not limited to heavy metals such as cadmium, chromium, zinc, lead and copper, oil and other hydrocarbon-based liquids, nutrients, sediment, debris and trash.

Figure 1:
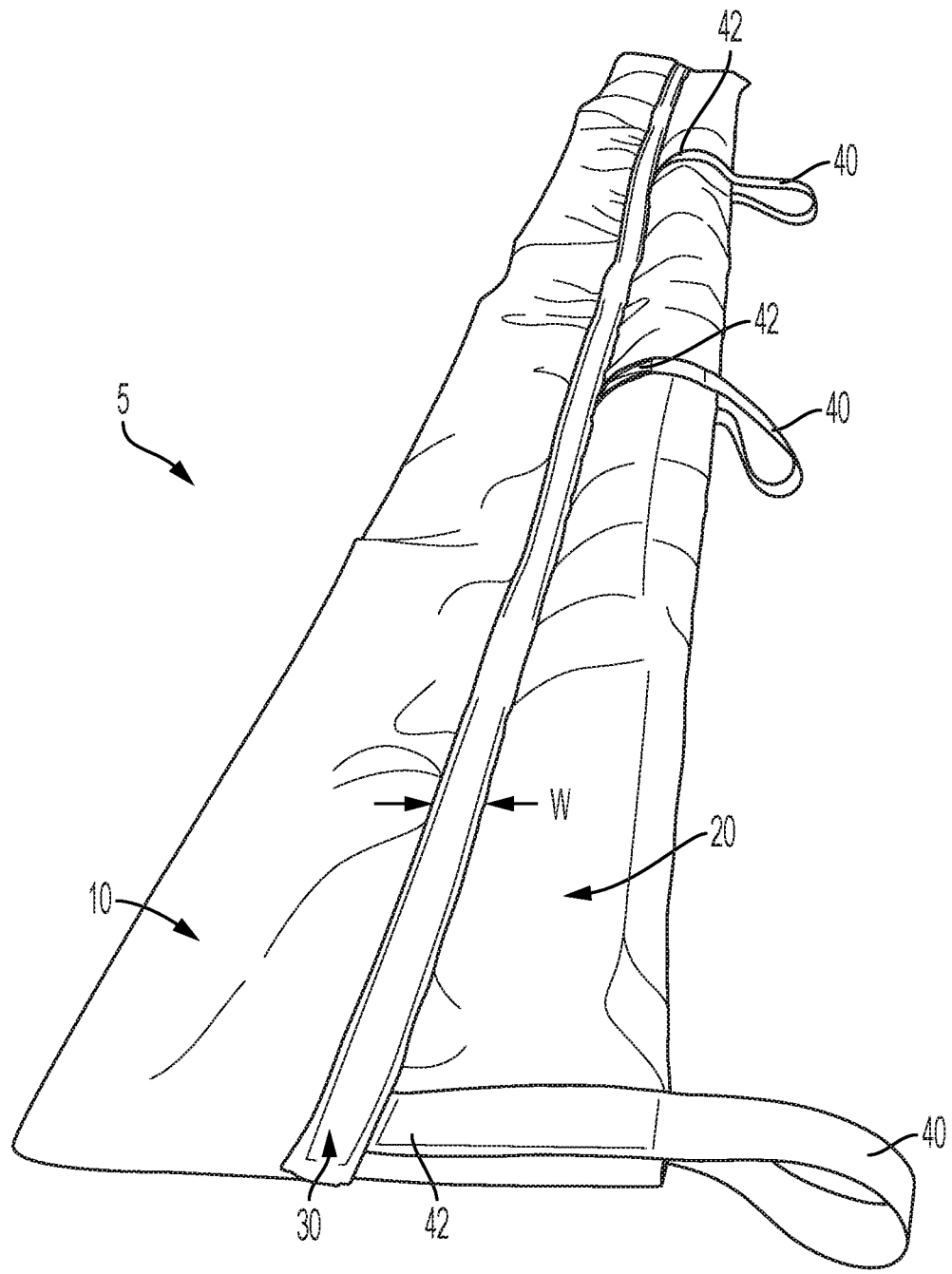
FIG. 1 is an isometric view of a multiple-tube stormwater filter sock in accordance with an embodiment of the present invention.
Figure 2:
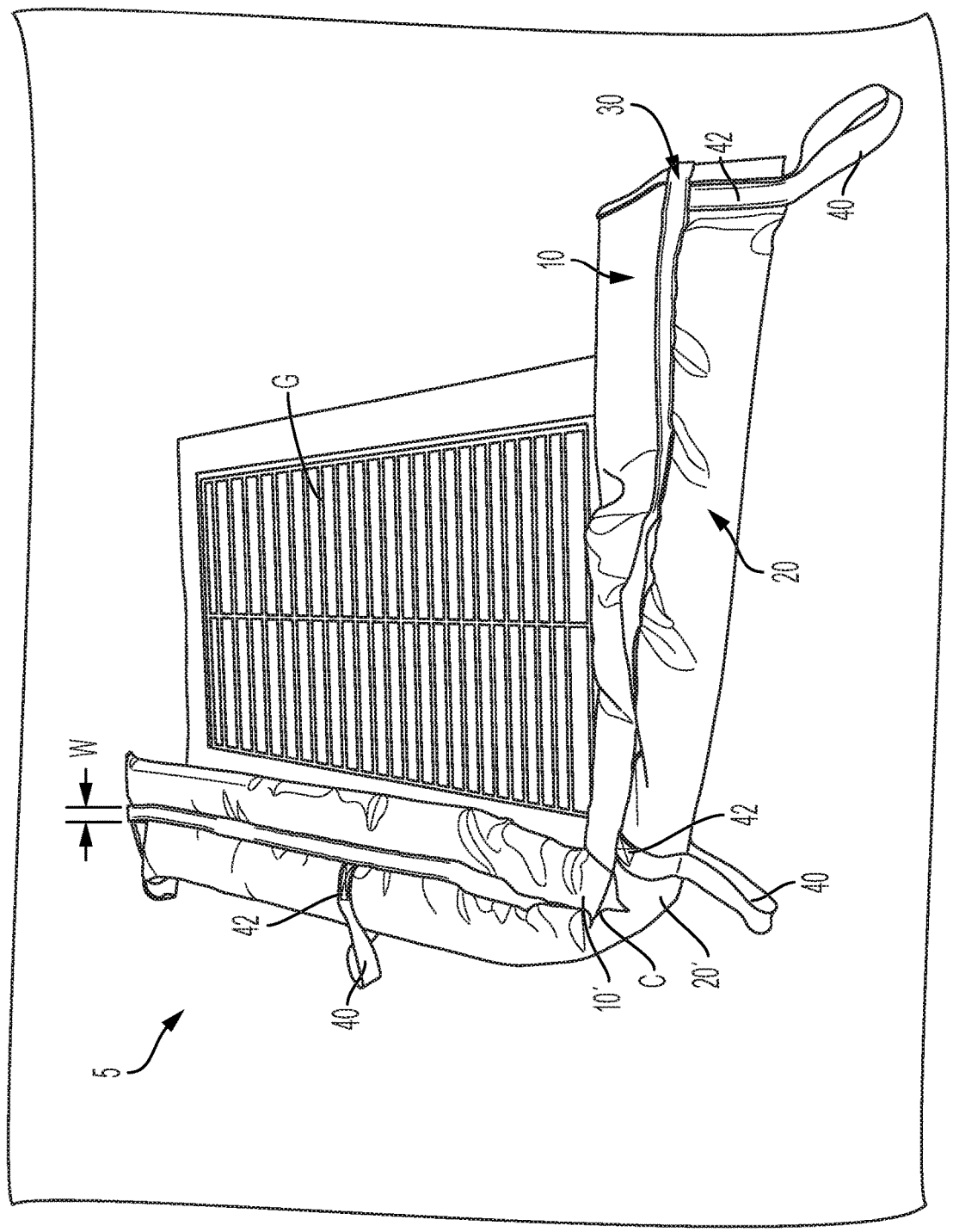
FIG. 2 is an isometric view of the multiple-tube stormwater filter sock of FIG. 1 installed around a stormwater drain.

FIGS. 1 and 2 illustrate a multiple-tube stormwater filter sock 5 in accordance with an embodiment of the present invention. In FIG. 1, a multiple-tube stormwater filter sock 5 is in an extended position, and in FIG. 2 it is in a generally L-shaped position installed around a portion of a perimeter of a storm drain grate G. The multiple-tube stormwater filter sock 5 includes a downstream tube 10, an upstream tube 20, and a separator web 30 having a width W. Multiple hand straps 40 are connected to the upstream tube 20 at strap attachment locations 42. As shown in FIG. 2, when the multiple-tube stormwater filter sock 5 is installed in a bent position around a storm drain grate G or other structure, a constricted corner C is formed where the downstream and upstream tubes 10' and 20' are drawn together. As more fully described below, the separator web 30 between the downstream and upstream tubes 10 and 20 allows the multiple-tube stormwater filter sock 5 to be easily installed in various bent or nonlinear configurations. Any suitable angle may be formed at the bent corner C portion, for example, 10°, 30°, 45°, 60°, 90°, or any other desired angle. Although a single bent stormwater filter sock 5 is shown in FIG. 2, it is to be understood that two or more of the filter socks 5 may be required to fully enclose a storm drain or other structure, e.g., by laying ends of multiple filter socks next to each other or on top of each other in overlapping configurations.

Figure 3:
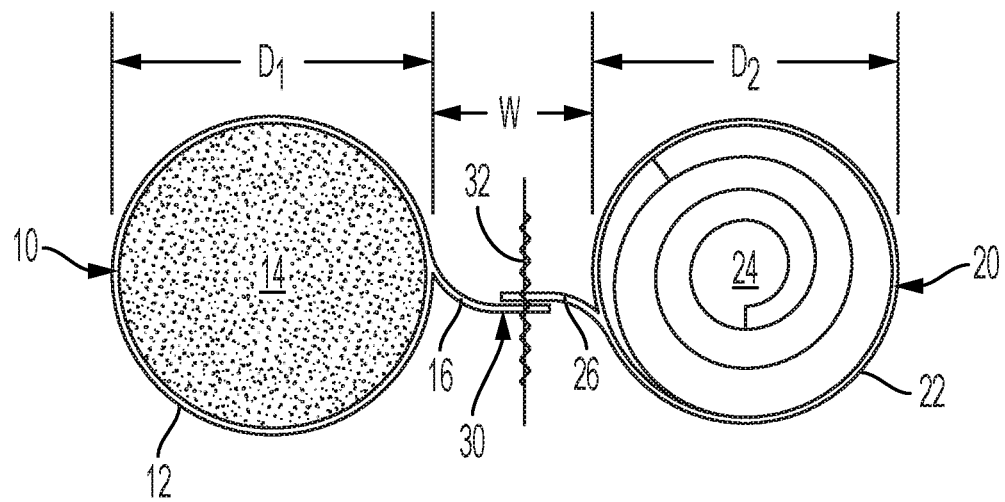
FIG. 3 is a partially schematic cross-sectional view of a multiple-tube stormwater filter sock in accordance with an embodiment of the present invention.

FIG. 3 is a partially schematic cross-sectional view showing the downstream tube 10 and the upstream tube 20 spaced apart by the separator web 30. The downstream tube 10 includes a liquid permeable outer shell 12 surrounding a downstream absorbent media 14. The upstream tube 20 includes a liquid permeable outer shell 22 surrounding an upstream absorbent media 24. In the embodiment shown in FIG. 3, the separator web 30 is formed from a downstream web extension flap 16 extending from the downstream tube 10 and an upstream web extension flap 26 extending from the upstream tube 20. The downstream and upstream web extension flaps 16 and 26 are fastened together by at least one sewn seam 32 to form the separator web 30.

As illustrated in FIG. 3, the downstream absorbent media 14 contained within the liquid permeable outer shell 12 may compromise a granular heavy metal ion-absorptive material, as more fully described below. In the embodiment shown in FIG. 3, the upstream absorbent media 24 contained within the liquid permeable outer shell 22 is in the form of a rolled-up mat made of fiberous hydrocarbon-absorbent material. However, any other suitable form of absorbent material may be used, such as bulk or loose fibers of hydrocarbon-absorbing material, woven or non-woven fabrics of hydrocarbon-absorbing material, and the like. When a mat of absorbent material is used as the upstream absorbent media 24 as shown in FIG. 3, it may have a typical thickness of from 0.1 to 1.2 inches before being rolled or folded. As more fully described below, the upstream absorbent media 24 may be made of hydrocarbon-absorbing materials such as polypropylene, polyester, cellulosic material, or the like.

As schematically shown in FIG. 3, the cross-section of the downstream tube 10 may be generally circular and may have a diameter $D_1$, and the cross-section of the upstream tube 20 may also be generally circular and may have a diameter $D_2$. However, during use, the downstream and upstream tubes 10 and 20 may not necessarily have circular cross-sections, in which case their cross-sectional dimensions in the horizontal direction may be descried as their widths.

Figure 4:
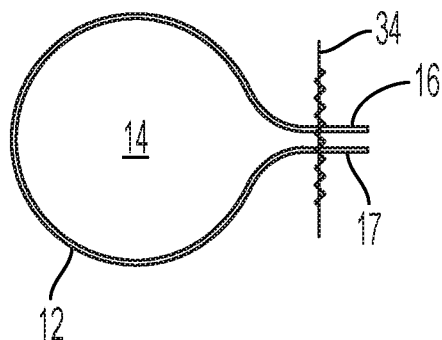
FIG. 4 is a partially schematic cross-sectional view of one tube of a multiple-tube stormwater filter sock that may be sewn or otherwise attached to another similar tube to produce a multiple-tube stormwater filter sock in accordance with an embodiment of the present invention.

FIG. 4 schematically illustrates a cross-section of a downstream liquid permeable outer shell 12 that may be filled with a downstream absorbent media 14 in accordance with another embodiment of the present invention. In this embodiment, the liquid permeable outer shell 12 forms opposing downstream web extension flaps 16 and 17 running along the length of the outer shell 12 that may be sewn together by a sewn seam 34. Although not shown in FIG. 4, the downstream liquid permeable outer shell 12 may be attached to an upstream liquid permeable shell 22 similar to that shown in FIG. 3, or may be attached to an upstream liquid permeable shell that is a mirror image of the downstream liquid permeable shell shown in FIG. 4.

Figure 5:
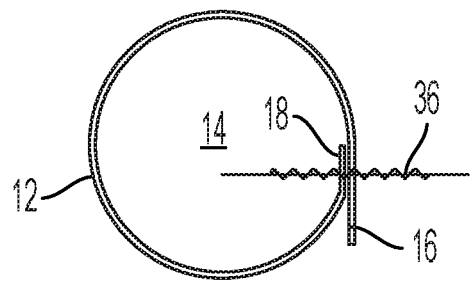
FIG. 5 is a partially schematic cross-sectional view of one tube of a multiple-tube stormwater filter sock that may be sewn or otherwise attached to another similar tube to produce a multiple-tube stormwater filter sock in accordance with an embodiment of the present invention.

FIG. 5 schematically illustrates a cross-section of a downstream liquid permeable outer shell 12 that may be filled with a downstream absorbent media 14 in accordance with another embodiment of the present invention. In this embodiment, the liquid permeable outer shell 12 has an exterior downstream web extension flap 16 and an interior edge 18 that may be sewn together by a sewn seam 36. Although not shown in FIG. 5, the downstream liquid permeable outer shell 12 may be attached to an upstream liquid permeable shell 22 similar to that shown in FIG. 3, or may be attached to an upstream liquid permeable shell that is a mirror image of the downstream liquid permeable shell 12 shown in FIG. 5.

Figure 6:
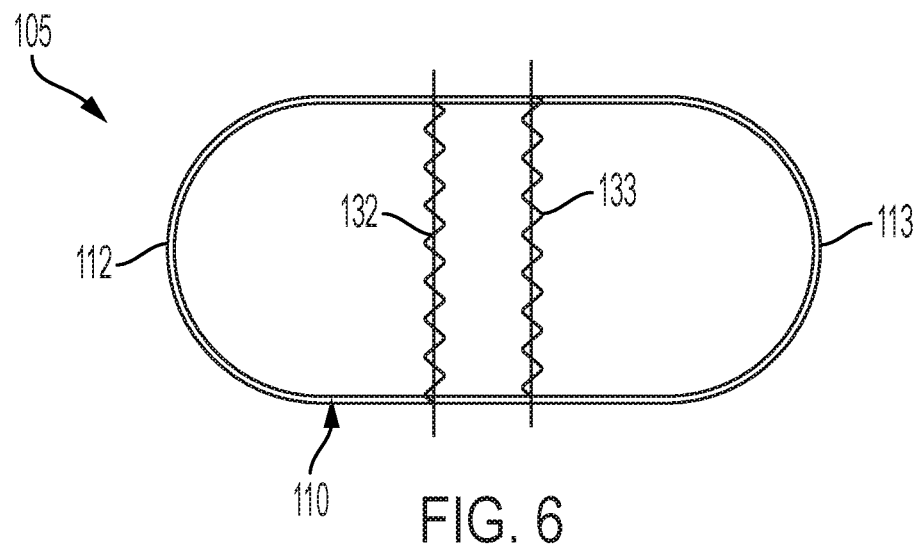
FIG. 6 is a partially schematic cross-sectional view illustrating the production of a multiple-tube stormwater filter sock from a larger starting tube in accordance with an embodiment of the present invention.
Figure 7:
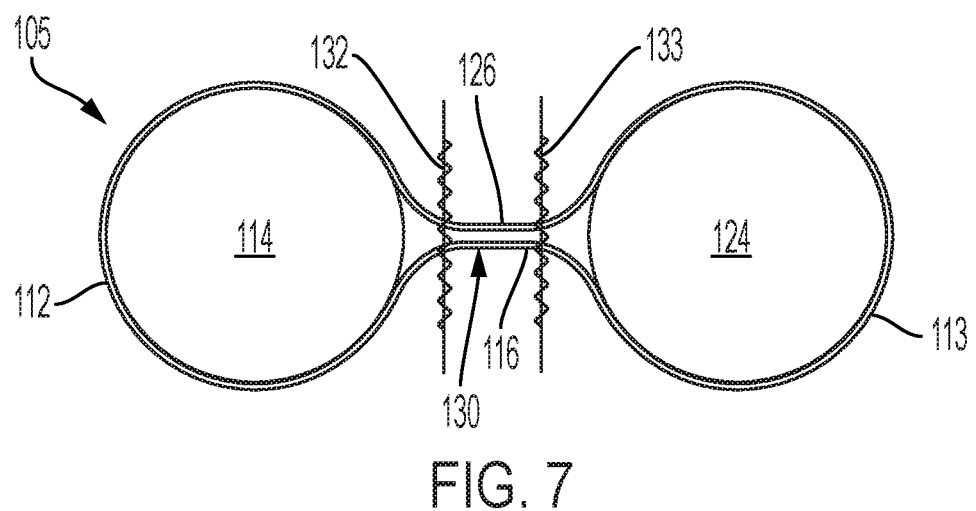
FIG. 7 is a partially schematic cross-sectional view illustrating the production of a multiple-tube stormwater filter sock from a larger starting tube in accordance with another embodiment of the present invention.

FIGS. 6 and 7 are is a partially schematic sectional views illustrating the fabrication of a multiple-tube stormwater filter sock 105 in accordance with another embodiment of the present invention. In this embodiment, flat sheet stock may be formed into a starting tube 110 by sewing, gluing, welding, or the like. The starting tube 110 may be made of liquid permeable material as described above, and includes one side 112 to be formed into a downstream tube, and another side 113 to be formed into an upstream tube. The starting tube 110 shown in FIG. 6 may be divided into separate upstream and downstream tubes 112 and 113 by sewn seams 132 and 133. When the seams 132 and 133 are sewn as shown in FIG. 7, a separator web 130 similar to the separator web 30 described above is provided. The separator web 130 includes a lower web panel 116 and an upper web panel 126 formed from portions of the starting tube 110. As shown in FIG. 7, the downstream tube 112 may be filled with a downstream absorbent material 114 similar to the downstream absorbent media 14 described in the embodiment above. In addition, the upstream tube 113 may be filled with an upstream absorbent media 124 similar to the upstream absorbent media 24 described in the embodiment above.

The downstream tube 10, 112 may have a horizontal width, the upstream tube 20, 113 may have a horizontal width, and the width W of the separator web 30, 130 may be at least 10 percent of the horizontal width of either the downstream or upstream tubes. For example, the width W of the separator web 30, 130 may be at least 20 percent of the horizontal widths of the downstream and upstream tubes. When the downstream tube 10, 112 has a generally circular cross-section having a diameter $D_1$ and the upstream tube 20, 113 has a generally circular cross-section having a diameter $D_2$, the width W of the separator web 30, 130 may be at least 20 percent of either the diameter $D_1$ of the downstream tube 10, 112 or the diameter $D_2$ of the upstream tube 20, 113. For example, the width W of the separator web 30, 130 may be at least 25 percent of the diameter $D_1$ of the downstream tube and the diameter $D_2$ of the upstream tube. In certain embodiments, the horizontal widths of the downstream 10, 112 and upstream 20, 113 tubes are from 1 to 10 inches, or from 2 to 6 inches. The ratio of the horizontal width of the upstream tube 20, 113 to the horizontal width of the downstream tube 10, 112 may range from 1:2 to 16:1. In certain embodiments, the horizontal widths of the downstream and upstream tubes may be substantially the same.

In certain embodiments, the upstream tube 20, 113 has a cross-sectional area, the downstream tube 10, 112 has a cross-sectional area, and the ratio of the upstream to downstream tube cross-sectional areas may range from 1:2 to 16:1. In certain embodiments, the ratio of the upstream tube 20, 113 cross-sectional area to the downstream tube 10, 112 cross-sectional area is from 1:2 to 2:1, for example, the cross-sectional areas of the upstream and downstream tubes may be the same, i.e., a 1:1 ratio. The cross-sectional area of the upstream tube 20, 113 may be typically equal to the downstream tube 10, 112, for example, 9.6 square inches. If the cross-sectional shape of each tube is circular, this corresponds to a 3.5-inch diameter tube.

The upstream tube 20, 113 may contain a media that absorbs hydrocarbons, such as lubricating oils, and filters out sediments and particles. For example, the upstream absorbent media 24 may comprise polymeric fibers, natural fibers, loose oil-absorbing particles, and the like. A typical media is a blend of polypropylene and polyester fibers. In certain embodiments, the media contained in the upstream tube 20, 113 does not significantly swell or expand during use, e.g., the media does not swell to many-times its volume when contacted with water or other liquids.

The width W of the separator web 30, as well as that of the separator web 130, may typically be from 0.5 to 3 inches, for example, from 1 to 2 inches. In a particular embodiment, the multiple-tube stormwater filter sock 5, 105 has a side-by-side, two-tube arrangement with a 1-inch separator web width W between the downstream tube 10, 112 and the upstream tube 20, 113. In certain embodiments, the separator webs 30 and 130 may have a highly visible strip, e.g., having a bright color, applied thereto to increase visibility.

The downstream tubes 12 and 112, and the upstream tubes 22 and 113 may be filled with the same or different media types. In certain embodiments, the media contained in the downstream tube 10, 112 and/or the media contained in the upstream tube 20, 113 does not significantly swell or expand during use, e.g., the media does not swell to many-times its volume when contacted with water or other liquids.

The downstream tube 10, 112 may be filled with a heavy metal ion absorptive media, such as zeolite, perlite, activated carbon, cellulosic materials (e.g., peat, wood chips, ground or shredded paper products) and/or graphene, or a blend of these. Placing the heavy metal absorptive media downstream reduces the probability that it will get fouled from hydrocarbon binding. A typical media is a 50/50 blend by volume of activated carbon and zeolite.

The liquid permeable outer shells 12, 22, 112 and 113 may be made of any material that allows free passage of liquid hydrocarbons and stormwater, such as woven or non-woven fabrics comprising polypropylene, polyester, polyethylene, polyamide, nylon and the like. Any suitable weight of material may be used for the liquid permeable outer shells 12, 22, 112 and 113, for example, from 2 to 20 ounce/sq. yard, or from 3 to 10 ounce/sq. yard. The liquid permeable outer shells 12, 22, 112 and 113 may have typical water flow rates measured by the ASTM D4491 standard test of from 50 to 300 gallons/minute/sq. foot, for example, from 150 to 200 gallons/minute/sq. foot. In one embodiment, the outer layer may comprise a 5.3-ounce/sq. yard, woven monofilament polypropylene fabric with a water flow rate of 170 gallons/minute/sq. foot as tested by ASTM D4491.

The following examples are intended to illustrate various aspects of the present invention, and are not intended to limit the scope of the invention.

Examples

Multiple-tube stormwater filter socks similar to those illustrated in FIGS. 1-3 having dimensions and absorbent media as listed in Table 1 were fabricated and tested. Table 2 lists the amounts of heavy metals removed per kilogram of absorbent filtration media.

TABLE 1

Amount of Heavy Metal Filtration Media

| Example | Cross-Sectional Area Ratio* | Upstream Dia (in) | Downstream Dia (in) | (Upstream) Wt (#) of Hydrocarbon - Sediment Media per linear foot | (Downstream) Wt (#) of Heavy Metal Media** per linear foot |
| --- | --- | --- | --- | --- | --- |
| 1 | 1:1 | 3.50 | 3.50 | 0.15 | 2.7 |
| 2 | 1.56:1 | 5.00 | 4.00 | 0.21 | 3.1 |
| 3 | 2.42:1 | 7.00 | 4.50 | 0.30 | 3.5 |

*Ratio of upstream tube to downstream tube
**50% by volume activated carbon, Calgon Carbon Corp from - Type DSR-C; and 50% by volume clinoptilite zeolite (calcium ion type), St. Cloud Mining, Inc. - Type NM-Ca.

TABLE 2

Heavy Metal Filtration Media Efficacy
Amount of Heavy Metal Removed per Kilogram of Filtration Media.

| Metal | Grams |
| --- | --- |
| Cadmium | 0.3 |
| Chromium | 0.5 |
| Copper | 2.1 |

TABLE 2-continued

Heavy Metal Filtration Media Efficacy
Amount of Heavy Metal Removed per Kilogram of Filtration Media.

| Metal | Grams |
| --- | --- |
| Iron | 8.2 |
| Lead | 9.3 |
| Zinc | 8.6 |

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A multiple-tube stormwater filter sock comprising:
    a downstream tube comprising a liquid permeable outer shell and an absorbent media at least partially filling the outer shell;
    an upstream tube comprising a liquid permeable outer shell and an absorbent media at least partially filling the outer shell, wherein the absorbent media of the downstream tube is different than the absorbent media of the upstream tube; and
    a separator web between the downstream and upstream tubes having a width W measured between the downstream and upstream tubes, wherein the separator web is structured and arranged to allow side-by-side bending of the downstream and upstream tubes during installation of the stormwater filter sock.

2. The stormwater filter sock of claim 1, wherein the downstream tube has a horizontal width, the upstream tube has a horizontal width, and the width W of the separator web is at least 10 percent of the horizontal width of either the downstream or upstream tubes.

3. The stormwater filter sock of claim 2, wherein the width W of the separator web is at least 20 percent of the horizontal widths of the downstream and upstream tubes.

4. The stormwater filter sock of claim 2, wherein the downstream tube has a generally circular cross-section having a diameter $D_1$, the upstream tube has a generally circular cross-section having a diameter $D_2$, and the width W of the separator web is at least 20 percent of either the diameter $D_1$ of the downstream tube or the diameter $D_2$ of the upstream tube.

5. The stormwater filter sock of claim 4, wherein the width W of the separator web is at least 25 percent of the diameter $D_1$ of the downstream tube and the diameter $D_2$ of the upstream tube.

6. The stormwater filter sock of claim 2, wherein the width W of the separator web is from 0.5 to 3 inches.

7. The stormwater filter sock of claim 6, wherein the horizontal widths of the downstream and upstream tubes are from 1 to 10 inches.

8. The stormwater filter sock of claim 7, wherein the horizontal widths of the downstream and upstream tubes are from 2 to 6 inches.

9. The stormwater filter sock of claim 2, wherein the ratio of the horizontal width of the upstream tube to the horizontal width of the downstream tube ranges from 1:2 to 16:1.

10. The stormwater filter sock of claim 2, wherein the horizontal widths of the downstream and upstream tubes are substantially the same.

11. The stormwater filter sock of claim 1, wherein the upstream tube has a cross-sectional area, the downstream tube has a cross-sectional area, and a ratio of the upstream to downstream tube cross-sectional areas ranges from 1:2 to 16:1.

12. The stormwater filter sock of claim 1, wherein the upstream and downstream tube cross-sectional areas are substantially the same.

13. The stormwater filter sock of claim 1, wherein the separator web extends substantially horizontally between the downstream and upstream tubes.

14. The stormwater filter sock of claim 1, wherein the liquid permeable shells of the downstream and upstream tubes are permeable to hydrocarbons.

15. The stormwater filter sock of claim 14, wherein the liquid permeable shells of the downstream and upstream tubes are made of a woven fabric comprising polypropylene, polyester, nylon, or cellulosic material.

16. The stormwater filter sock of claim 15, wherein the separator web comprises the same material as either the downstream or upstream tubes.

17. The stormwater filter sock of claim 1, wherein the separator web comprises extensions of material from the downstream and upstream liquid permeable shells.

18. The stormwater filter sock of claim 1, wherein the downstream and upstream liquid permeable shells are made from separate pieces of fabric that are sewn together.

19. The stormwater filter sock of claim 1, wherein the downstream liquid permeable shell, upstream liquid permeable shell, and separator web are made from a single continuous tube of liquid permeable fabric.

20. The stormwater filter sock of claim 1, wherein the absorbent media of the downstream tube is a hydrocarbon-absorbing media, and the absorbent media of the upstream tube is a heavy metal-absorbing media.

21. The stormwater filter sock of claim 20, wherein the absorbent media of the downstream tube comprises granular zeolite, partite, activated carbon or cellulosic material, and the absorbent media of the upstream tube comprises fibers of polypropylene, polyester, or cellulosic material.

22. The stormwater filter sock of claim 21, wherein the absorbent media of the upstream tube comprises a rolled or folded mat.

23. A multiple-tube stormwater filter sock comprising:
    a downstream tube comprising a liquid, permeable outer shell and an absorbent media at least partially filling the outer shell;
    an upstream tube comprising a liquid permeable outer shell and an absorbent media at least partially filling the outer shell; and
    a separator web between the downstream and upstream tubes having a width W measured between the downstream and upstream tubes, wherein the separator web is structured and arranged to allow side-by-side bending of the downstream and upstream tubes during installation of the stormwater filter sock, and the downstream and upstream liquid permeable shells are made from separate pieces of fabric that are sewn together.

* * * * *